US00RE43579E

(19) United States
(12) Reissued Patent
Takiguchi

(10) Patent Number: US RE43,579 E
(45) Date of Reissued Patent: Aug. 14, 2012

(54) MEMORY CHIP, PROCESS CARTRIDGE AND IMAGE FORMING APPARATUS

(75) Inventor: Toshio Takiguchi, Kashiwazaki (JP)

(73) Assignee: Fuji Xerox Co., Ltd., Tokyo (JP)

(21) Appl. No.: 11/802,591

(22) Filed: May 23, 2007

Related U.S. Patent Documents

Reissue of:
(64) Patent No.: 6,898,380
Issued: May 24, 2005
Appl. No.: 10/628,474
Filed: Jul. 29, 2003

(30) Foreign Application Priority Data

Dec. 24, 2002 (JP) ..... 2002-371562

(51) Int. Cl.
*G03G 15/00* (2006.01)

(52) U.S. Cl. ..... 399/12; 399/111

(58) Field of Classification Search ..... 399/12, 399/13, 25, 27, 107, 111, 119; 710/300
See application file for complete search history.

(56) References Cited

U.S. PATENT DOCUMENTS 4,872,845 A * 10/1989 Korsunsky et al. ..... 439/70
5,768,659 A 6/1998 Kameda
6,097,908 A * 8/2000 Uchiyama et al. ..... 399/111
6,430,644 B1 * 8/2002 Luen et al. ..... 710/300
6,654,567 B2 11/2003 Karakama et al.
6,697,578 B2 * 2/2004 Watanabe et al. ..... 399/12

FOREIGN PATENT DOCUMENTS

| | | |
|---|---|---|
| CN | 1349136 A | 5/2002 |
| JP | 8-95468 | 4/1996 |
| JP | 9-213407 | 8/1997 |
| JP | 9-296662 | 11/1997 |
| JP | 11-47400 | 2/1999 |
| JP | 11-160949 | 6/1999 |
| JP | 2000-187415 | 7/2000 |
| JP | 2002-072824 | 3/2002 |
| JP | 2002-229415 | 8/2002 |

* cited by examiner

*Primary Examiner* — Hoang Ngo
(74) *Attorney, Agent, or Firm* — Morgan, Lewis & Bockius LLP

(57) ABSTRACT

An electronic device support member is fitted into and pressingly attached to a cover so that a face on which an electronic device and an antenna are disposed is opposed to the rear face of the cover. A base has a fitting receive portion into which a fitting portion of the cover is to be fitted, on the peripheral edge of the surface opposed to the cover. Two elastic claws are disposed on the peripheral edge of the rear face. A second housing has a recess portion into which a memory chip is to be fitted and secured, in the surface. The recess portion is formed into a circular concave shape, and has two engagement portions for respectively receiving the elastic claws of the memory chip.

47 Claims, 10 Drawing Sheets

MEMORY CHIP, PROCESS CARTRIDGE AND IMAGE FORMING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a memory chip which is to be attached to a unit, a process cartridge having such a memory chip, and an image forming apparatus of the electrophotographic system or the like having such a cartridge.

2. Description of the Related Art

It is known that an electronic device such as a memory in which an IC socket is integrated with a connector is mounted on a process cartridge that is to be detachably attached to, for example, a main unit of an image forming apparatus, in order to supply information characteristic of the process cartridge to the image forming apparatus main unit, and to store information supplied from the image forming apparatus main unit as disclosed in JP-A-9-213407. In the case where an electronic device such as a memory is to be mounted on a process cartridge, for example, the electronic device is sometimes modularized so as to be easily assembled. A technique is known in which a radio communication device is attached to an outer face of a process cartridge or the like that is to be detachably attached to an image forming apparatus main unit, and information is transmitted from the cartridge to the image forming apparatus main unit by means of radio communication as disclosed in JP-A-2000-187415.

An electronic device such as a memory which is mounted on a process cartridge stores, for example, history information characteristic to the process cartridge. When the electronic device is configured so as to be easily detached from the cartridge from the outside, the information stored therein often becomes incorrect as a result of rewriting of the stored contents or replacement of the electronic device. When the electronic device is erroneously detached from the process cartridge, the process cartridge cannot be sometimes further used.

SUMMARY OF THE INVENTION

The invention has been conducted in view of the circumstances. It is an object of the invention to provide a memory chip which is attachable to and detachable from an apparatus main unit, and which can store correct information, a process cartridge having such a memory chip, and an image forming apparatus having such a process cartridge.

In order to attain the object, a first feature of the invention is in a memory chip which is to be attached to a unit, wherein the memory chip comprises: an electronic device having a memory function; a cover which covers the electronic device; and a securing section which substantially disables the cover to be detached from the unit from an outside of the unit. Therefore, the memory chip can be prevented from being detached from the unit from the outside, or from erroneously escaping from the unit. As a result, correct information such as the history of the apparatus main unit can be stored.

Preferably, the electronic device has a communication function. Preferably, the securing section has an elastic claw, and the elastic claw is engaged with the unit to perform securement. Preferably, a base is secured to an inner side of the cover, and the elastic claw is disposed on the base. Preferably, the cover is made of a same material as a material of the unit, and colored in a same color as a color of the unit. Preferably, the unit has a recess portion, and the cover is fitted into the recess portion to be secured in a depressed manner. Preferably, the electronic device is supported by an electronic device support member, and the electronic device support member is secured to an inner side of the cover. Preferably, the electronic device support member has an antenna. Preferably, the unit is a process cartridge having at least an image carrier.

A second feature of the invention is in a process cartridge which is detachably attached to an image forming apparatus main unit, and which has at least an image carrier, wherein the process cartridge has a process cartridge main unit, and a memory chip attached to the process cartridge main unit, and the memory chip comprises: an electronic device having a memory function; a cover which covers the electronic device; and a securing section which substantially disables the cover to be detached from the process cartridge main unit from an outside of the process cartridge.

A third feature of the invention is in an image forming apparatus wherein the apparatus has: an image forming apparatus main unit; and a process cartridge which is detachably attached to the image forming apparatus main unit, and which has at least an image carrier, and the process cartridge comprises a memory chip, the memory chip including: an electronic device having a memory function; a cover which covers the electronic device; and a securing section which substantially disables the cover to be detached from the process cartridge from an outside of the process cartridge.

DETAILED DESCRIPTION OF THE PREFERRED EMBODIMENTS

Now, an embodiment of the invention will be described with reference to the accompanying drawings.

Figure 1:
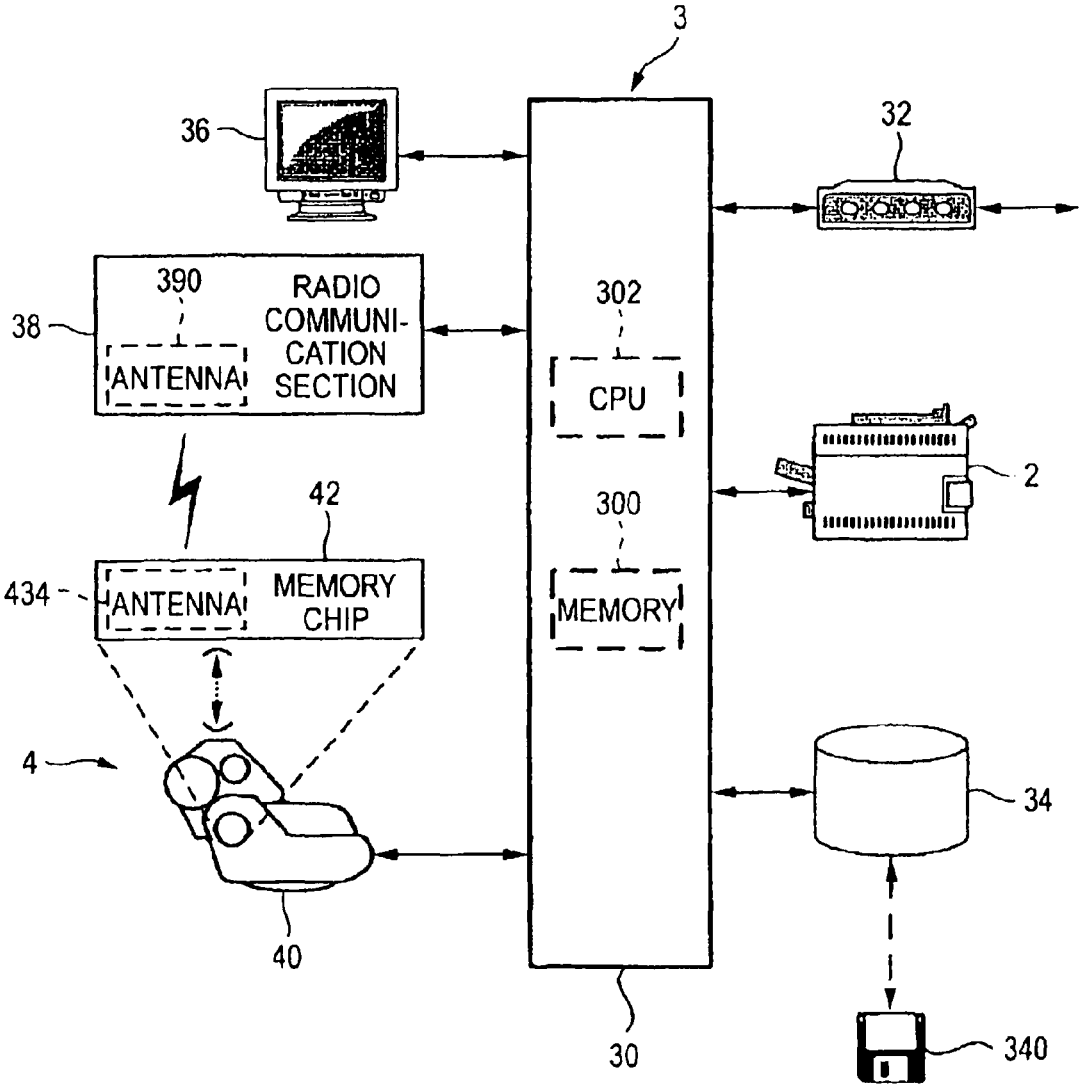
FIG. 1 is a view exemplarily showing the configuration of an image forming apparatus which is an embodiment of the invention.

FIG. 1 exemplarily shows the configuration of an image forming apparatus 1 which is an embodiment of the invention.

The image forming apparatus 1 includes an image forming apparatus main unit 2, a control device 3, and a process cartridge 4.

The process cartridge 4 which will be described later can be attached to and detached from the image forming apparatus main unit 2 which operates under the control of the control device 3.

The control device 3 is configured by a control device body 30, a communication device 32, a record device 34, a display/input device (UI) 36, and a radio communication section 38. The control device body 30 includes a memory 300 including a RAM and a writable nonvolatile memory (both are not shown), and a CPU 302, controls various components of the image forming apparatus 1, and performs processes such as image formation. The record device 34 can perform operations of inputting and outputting programs and data to and from the external of the image forming apparatus 1 via, for example, a recording medium 340. The radio communication section 38 transmits and receives a radio signal to and from a memory chip 42 (see FIGS. 5 to 8) which will be described later.

The process cartridge 4 has a main unit 40 and the memory chip 42, and operates under the control of the control device 3. The memory chip 42 stores information characteristic of the main unit 40 and the like, transmits and receives a radio signal to and from the radio communication section 38, and, when the information is updated, stores the updated information.

The memory chip 42 may be connected so as to directly communicate information which is produced in the main unit 40, such as that indicative of the remaining quantity of toner to the main unit 40, or alternatively configured so as to receive the information via the control device body 30 and the radio communication section 38.

The main unit 40 corresponds to the unit in the invention, and the image forming apparatus main unit 2 to the image forming apparatus main unit in the invention.

Figure 2:
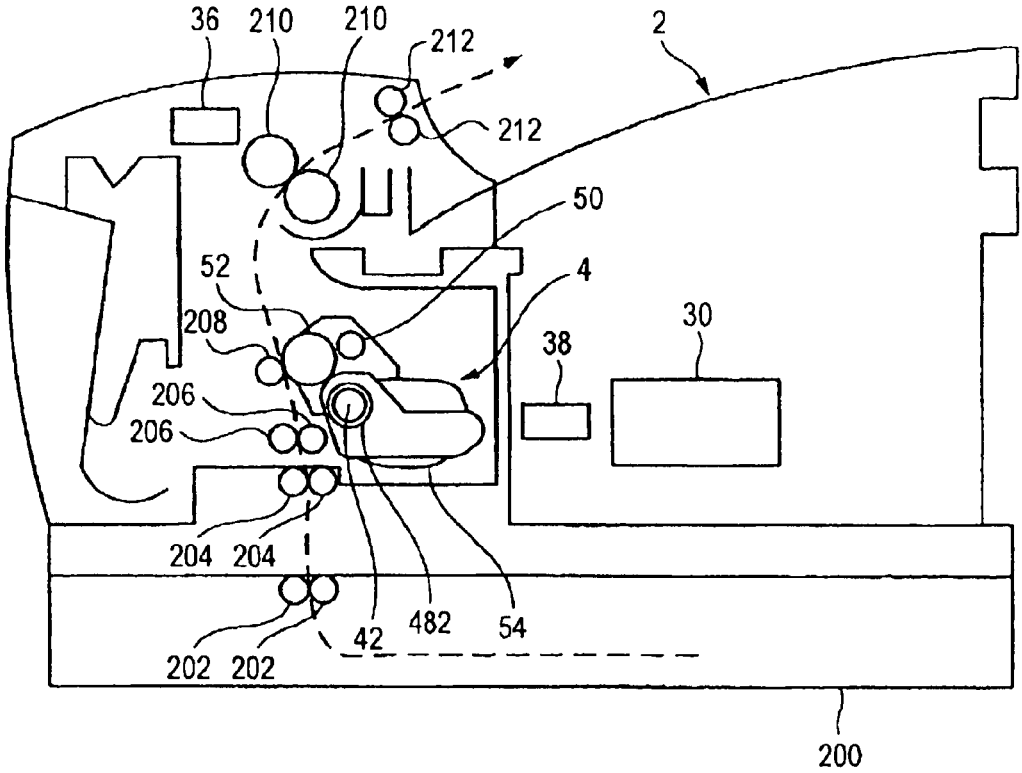
FIG. 2 is a view schematically showing a state where a process cartridge of the embodiment of the invention is attached to a main unit of the image forming apparatus.

FIG. 2 schematically shows a state where the process cartridge 4 is attached to the image forming apparatus main unit 2. As shown in FIG. 2, the image forming apparatus main unit 2 includes a sheet supply section 200, sheet supply rollers 202, 204, registration rollers 206, a transfer roller 208, fixing rollers 210, and discharging rollers 212.

Figure 3:
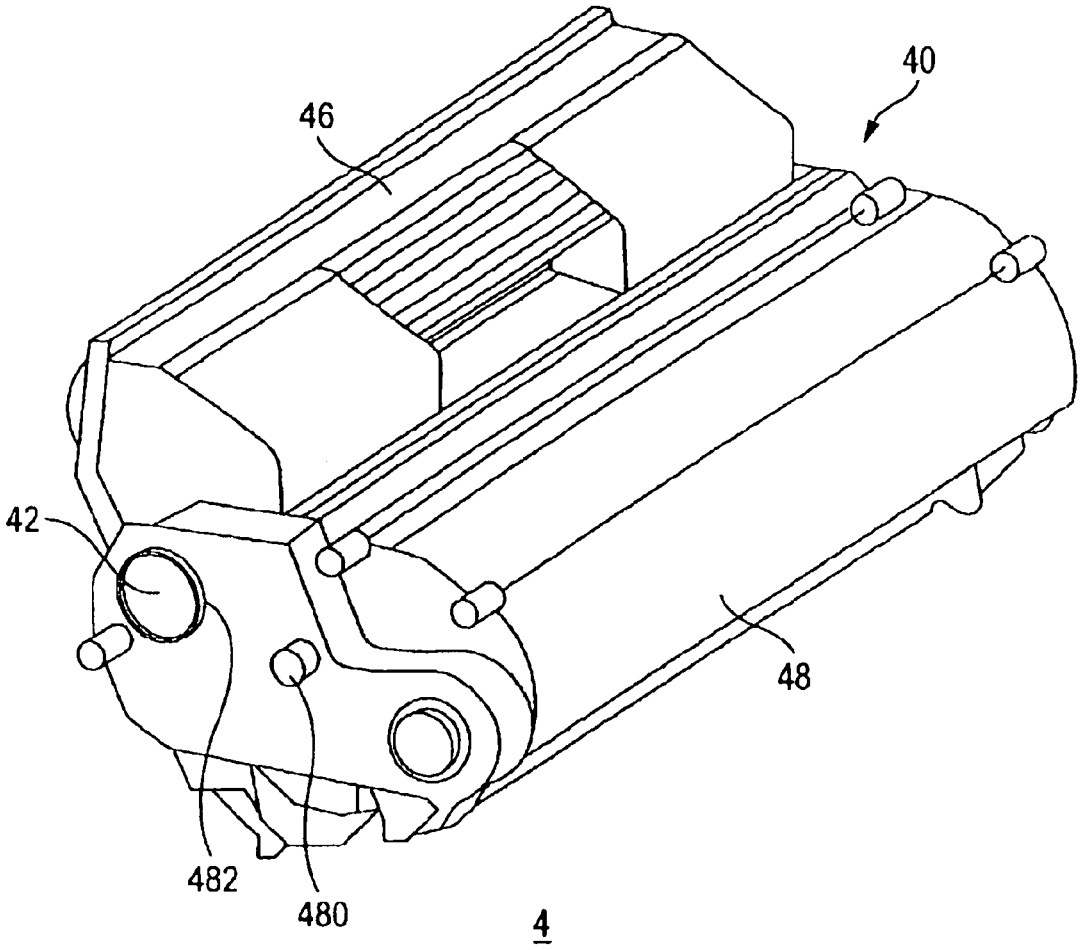
FIG. 3 is a perspective view showing the process cartridge of the embodiment of the invention.

The process cartridge 4 is placed between the sheet supply section 200 which is disposed in a lower part of the image forming apparatus main unit 2, and the discharging rollers 212 which is disposed in an upper part of the main unit. As described above, the process cartridge 4 has the main unit 40 and the memory chip 42. As shown in FIG. 3, the main unit 40 includes a first housing 46 and a second housing 48. The first and second housings 46 and 48 are secured to each other by securing pins 480. The first housing 46 includes a charging section 50 (FIG. 2), an image carrier 52 such as a photoconductive drum, and a cleaning blade (not shown). The second housing 48 includes a toner container 54, a developing roller, and a toner regulation blade (both are not shown), and has a recess portion 482 in the surface. The recess portion includes a depression into which the memory chip 42 (see FIG. 9) is to be fitted and secured, and which is formed into, for example, a circular concave shape. The recess portion 482 is disposed in the surface of the second housing 48 in order to allow the memory chip 42 to transmit and receive a radio signal to and from the radio communication section 38, and also to facilitate the work of securing the memory chip 42.

In practice, the components of the control device 3 are distributedly placed in the inside or the surface of the image forming apparatus main unit 2. For example, the control device body 30 (FIGS. 1 and 2) is placed in the inside of the image forming apparatus main unit 2, and the display/input device 36 on the surface of the image forming apparatus main unit 2.

Next, the function of the embodiment will be described.

In the image forming apparatus 1, a sheet housed in the sheet supply section 200 is transported toward the registration rollers 206 by the sheet supply rollers 202, 204, and then toward the process cartridge 4 by the registration rollers 206. In the process cartridge 4, the image carrier 52 is charged by the charging section 50, and the image carrier 52 is irradiated with a laser beam in a pattern which corresponds to an image signal for performing an image forming process (such as printing) by a laser unit (not shown) on the basis of a control by the control device body 30. A toner housed in the toner container 54 adheres to an electrostatic pattern which is formed on the image carrier 52 by the laser beam. The toner is then transferred to the sheet by the transfer roller 208. Thereafter, the transferred toner is thermally fixed to the sheet by the fixing rollers 210. The sheet is then discharged by the discharging rollers 212 to the outside of the image forming apparatus 1. The control device 3 transmits updated information such as the number of printed sheets, to the memory chip 42 via the radio communication section 38. The memory chip 42 stores the updated information.

Next, with respect to the radio communication section 38 and the memory chip 42, their circuit configurations and communication between them will be described.

Figure 4:
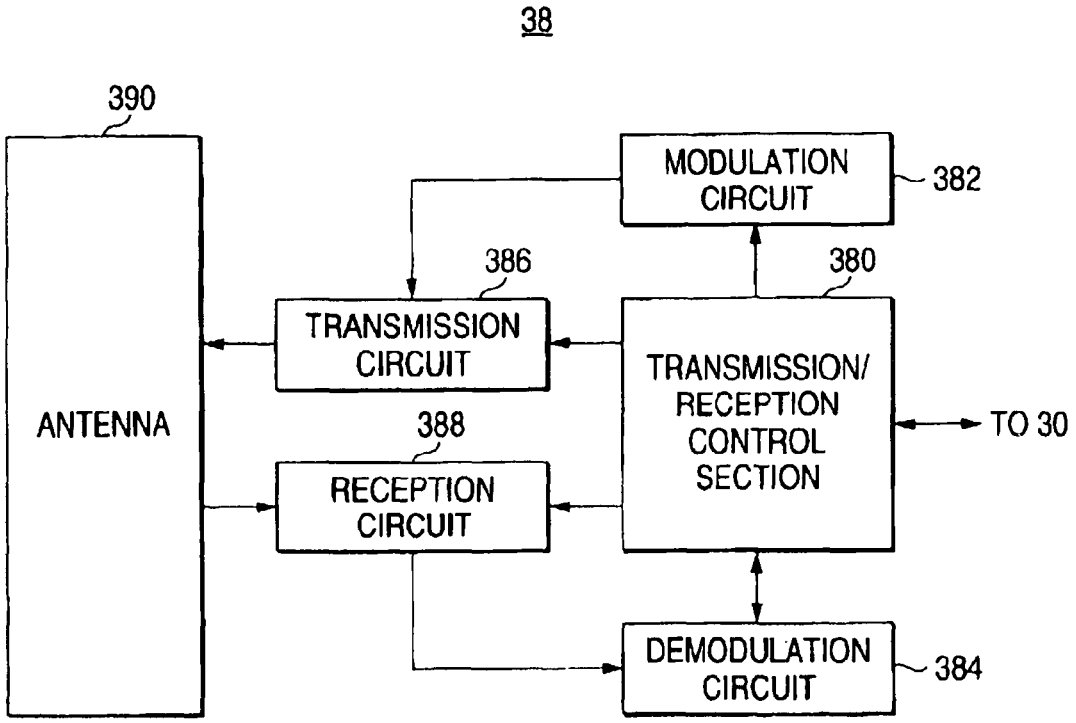
FIG. 4 is a diagram showing the circuit configuration of a radio communication section in the image forming apparatus of the embodiment of the invention.

FIG. 4 is a diagram showing the circuit configuration of the radio communication section 38.

Figure 5:
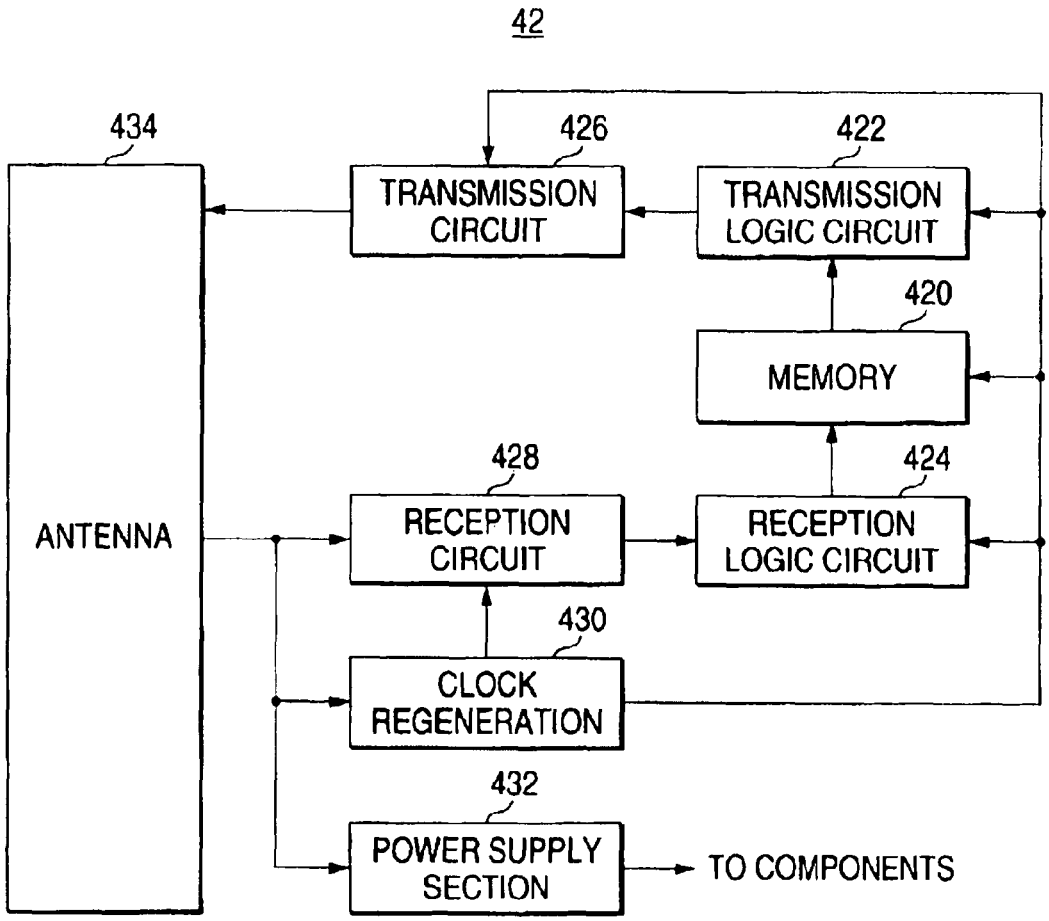
FIG. 5 is a diagram showing the circuit configuration of a memory chip of the embodiment of the invention.

FIG. 5 is a diagram showing the circuit configuration of the memory chip 42.

As shown in FIG. 4, the radio communication section 38 is configured by a transmission/reception control section 380, a modulation circuit 382, a transmission circuit 386, a reception circuit 388, a demodulation circuit 384, and an antenna 390. In the radio communication section 38, the transmission/reception control section 380 controls the operations of the components of the radio communication section 38. The transmission/reception control section 380 supplies data sent from the control device body 30, to the modulation circuit 382. The transmission/reception control section 380 supplies data which are received by the reception circuit 388 and demodulated by the demodulation circuit 384, to the control device body 30. The modulation circuit 382 demodulates the data supplied from the transmission/reception control section 380, and supplies the modulated data to the transmission circuit 386. The transmission circuit 386 outputs radio signals including data to be stored into the memory chip 42 and a clock signal, to the memory chip 42 via the antenna 390.

The reception circuit 388 receives via the antenna 390 the signal transmitted from the memory chip 42, and supplies the received signal to the demodulation circuit 384. Based on changes of the signal supplied from the reception circuit 388, the demodulation circuit 384 demodulates the data transmitted from the memory chip 42, and supplies the demodulated data to the transmission/reception control section 380.

As shown in FIG. 5, the memory chip 42 is configured by a memory 420, a transmission logic circuit 422, a reception logic circuit 424, a transmission circuit 426, a reception circuit 428, a clock regeneration circuit 430, a power supply section 432, and an antenna 434. As described later with reference to FIGS. 6 to 8, the circuits constituting the memory chip 42 are disposed on an electronic device support member 442, and the electronic device support member 442 is sealed by a cover 436 and a base 438.

When a radio signal is transmitted from the radio communication section 38 to the memory chip 42, the reception circuit 428, the clock regeneration circuit 430, and the power supply section 432 receive the radio signal via the antenna 434. In the memory chip 42, when the radio signal is received, the power supply section 432 rectifies a current which is generated by electromagnetic induction due to the radio signal, and supplies to the components of the memory chip 42, an electric power required for the components to operate. In the case where the memory chip 42 requires a voltage which is higher than that generated by the power supply section 432, for example, the memory chip 42 may be configured so as to receive electric power from the main unit 40. The electric power may be supplied from the main unit 40 to the memory chip 42 through wires. Alternatively, a coil for power supply and the like may be disposed in the memory chip 42, and electric power may be supplied in a non-contact manner from an AC current supplied to the main unit 40.

When the radio signal is received, the clock regeneration circuit 430 regenerates the clock signal, and supplies the regenerated clock signal to the circuits constituting the memory chip 42. When the radio signal is received, the reception circuit 428 supplies signals indicative of data contained in the radio signal, to the reception logic circuit 424 in synchronization with the clock signal sent from the clock regeneration circuit 430. The reception logic circuit 424 demodulates the signal of data and the like in synchronization with the clock signal sent from the clock regeneration circuit 430, and supplies the demodulated signal to the memory 420.

The memory 420 includes, for example, a writable nonvolatile memory (not shown). When the signal supplied from the reception logic circuit 424 indicates writing of data, the data is written (stored) into the memory 420 in synchronization with the clock signal sent from the clock regeneration circuit 430, and, when the signal indicates reading of data, data stored in the memory 420 is supplied to the transmission logic circuit 422. The nonvolatile memory included in the memory 420 may be, for example, an EEPROM or a FeRAM (ferroelectric memory).

The transmission logic circuit 422 modulates the data supplied from the memory 420 in synchronization with the clock signal sent from the clock regeneration circuit 430, and supplies the modulated data to the transmission circuit 426. The transmission circuit 426 transmits the signal which is supplied from the transmission logic circuit 422 in synchronization with the clock signal sent from the clock regeneration circuit 430, in the form of a radio signal to the radio communication section 38 via the antenna 434.

The signal which is to be transmitted and received in the form of a radio signal may be first encrypted, converted to a radio signal, and then transmitted and received. For example, an authorized worker is allowed to rewrite the contents of the memory 420 via an apparatus other than the control device body 30 by using an encrypted radio signal.

Next, the shape and configuration of the memory chip 42 will be described.

Figure 6A:
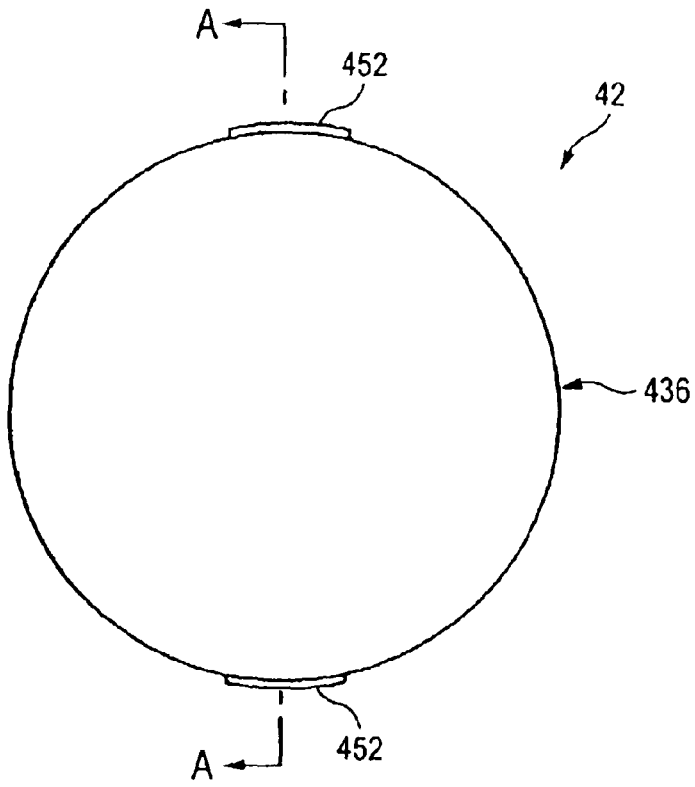
FIG. 6A is a front view showing an appearance of the memory chip of the embodiment of the invention.
Figure 6B:
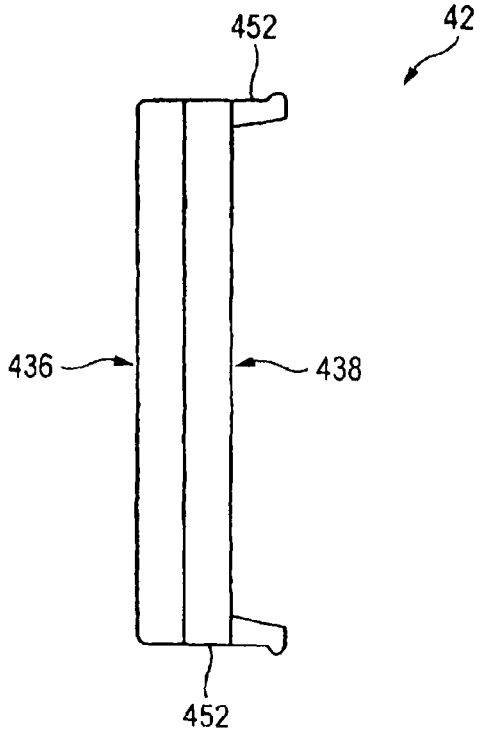
FIG. 6B is a side view showing an appearance of the memory chip.
Figure 7:
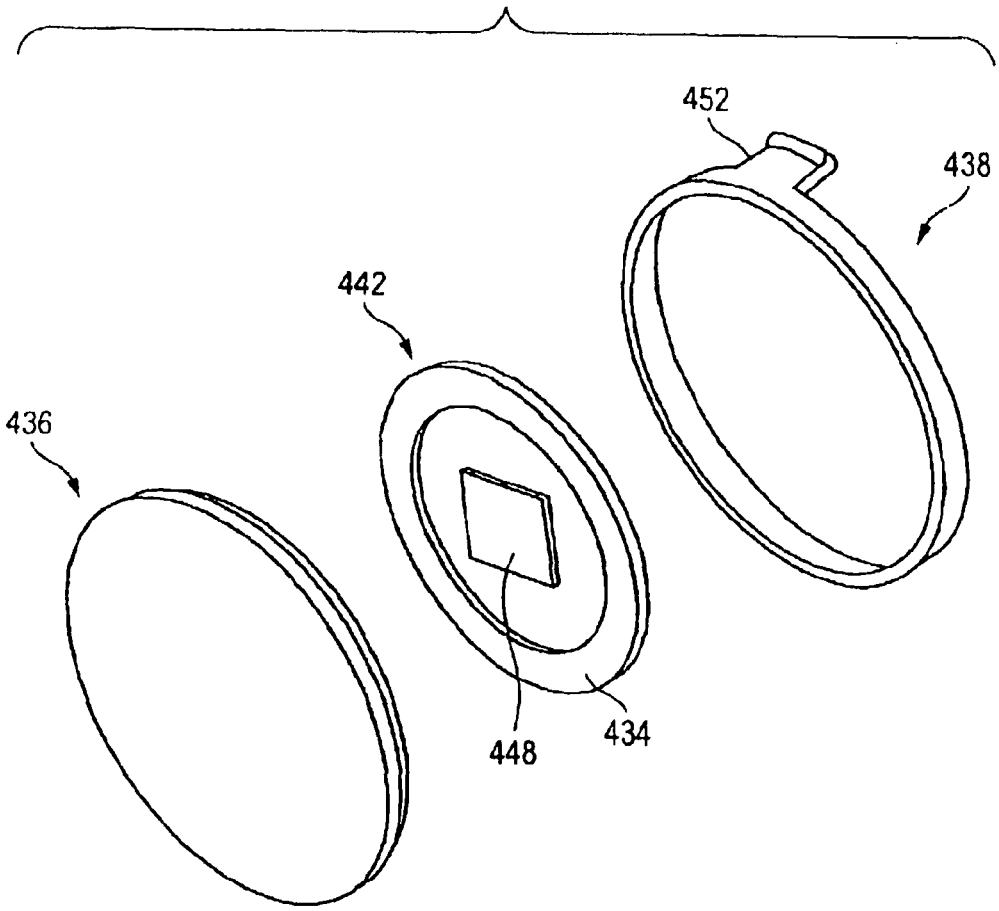
FIG. 7 is an exploded perspective view of the memory chip of the embodiment of the invention.
Figure 8:
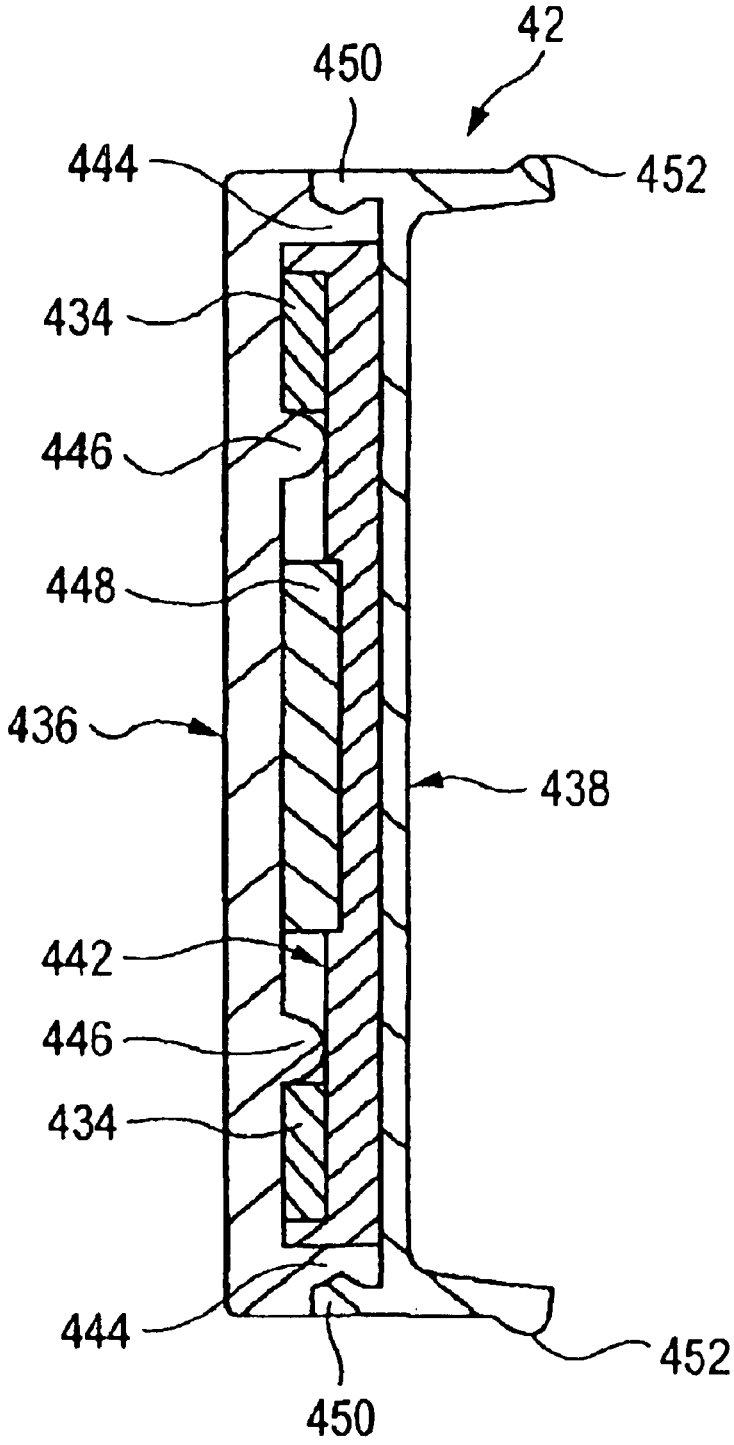
FIG. 8 is a section view of the memory chip of the embodiment of the invention.

FIGS. 6 to 8 show the details of the memory chip 42.

The memory chip 42 is configured by the cover 436, the base 438, and the electronic device support member 442 which have, for example, a circular shape. The cover 436 is formed into a circular shape by using, for example, an ABS resin. A fitting portion 444 which is to be fitted into the base 438 is disposed on the peripheral edge of the rear face of the cover. The rear face of the cover 436 is recessed so that the electronic device support member 442 can be fitted thereinto, and provided with a projection 446 having, for example, a circumferential shape in order to define the position of the electronic device support member 442. The projection 446 is preferably set to have a height at which, even when the electronic device support member 442 is pressed against the cover 436, no pressure is applied to an electronic device 448 that will be described later.

The electronic device support member 442 includes the electronic device 448 which houses the circuits constituting the memory chip 42, and the antenna 434 such as an antenna coil. The antenna 434 may be formed on the electronic device support member 442 so as to match the shape of the antenna 434, as in the case where the antenna is a planar antenna. The electronic device 448 is requested to be housed in the memory chip 42 while being placed on the electronic device support member 442, and may have a different configuration depending on the kind and shape of the electronic device such as the case where the device includes a CPU.

The base 438 has a fitting receive portion 450 into which the fitting portion 444 of the cover 436 is to be fitted, on the peripheral edge of the surface opposed to the cover 436. For example, two elastic claws 452 are disposed on the peripheral edge of the rear face so as to be outward directed. The elastic claws 452 are formed so as to protrude more outward than the outer periphery of the cover 436.

The electronic device support member 442 is fitted into and pressingly attached to the cover 436 so that the face on which the electronic device 448 and the antenna 434 are disposed is opposed to the rear face of the cover 436. Alternatively, the electronic device support member 442 may be secured by bonding the antenna 434 to the rear face of the cover 436 by an adhesive agent. The fitting portion 444 of the cover 436 is fitted into the fitting receive portion 450 of the base 438, thereby sealing the electronic device support member 442 which is pressingly attached to the rear face of the cover 436.

Next, the securement of the memory chip 42 will be described in detail.

Figure 9:
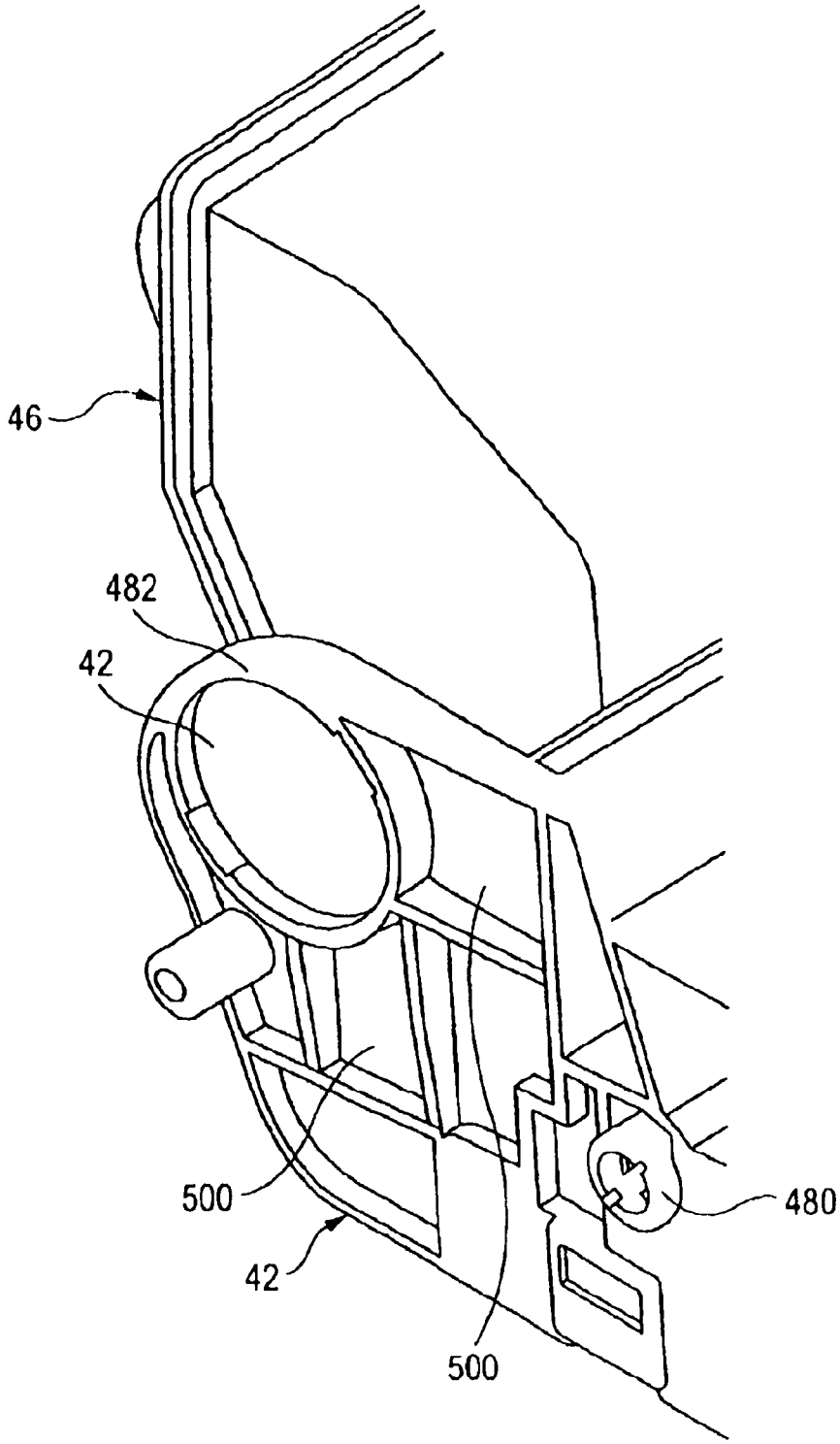
FIG. 9 is an enlarged view showing a state where the memory chip of the embodiment of the invention is secured to a second housing.

FIG. 9 is an enlarged view showing a state where the memory chip 42 is secured to the second housing 48 (see FIG. 3).

Figure 10:
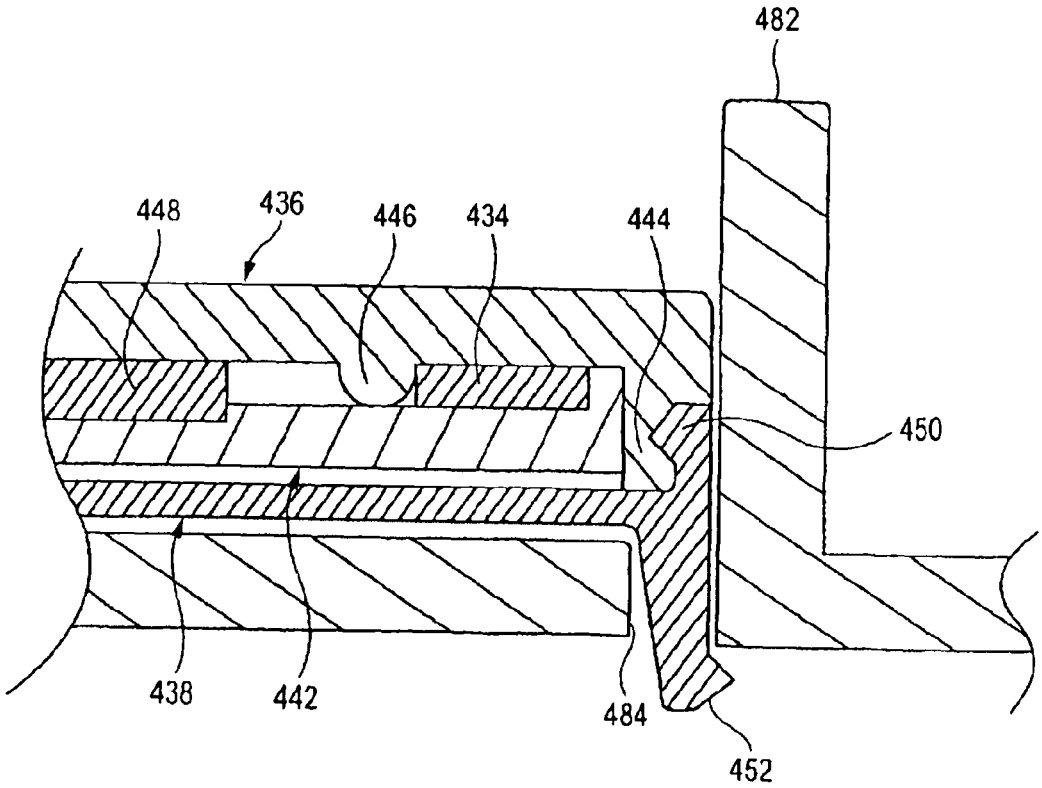
FIG. 10 is an enlarged section view showing the state of FIG. 9.

FIG. 10 is an enlarged section view showing the state where the memory chip 42 is secured.

As described above, the recess portion 482 is formed into a circular concave shape, and has, for example, two engagement portions 484 for respectively receiving the two elastic claws 452 of the memory chip 42. Each of the engagement portions 484 is configured by, for example, a hole which is to be engaged with the corresponding one of the elastic claws 452. Although the elastic claws 452 protrude more outward than the outer periphery of the cover 436, the memory chip 42 is fittingly inserted into the recess portion 482 because the elastic claws 452 have elasticity. When the memory chip 42 is fittingly inserted into the recess portion 482 and the elastic claws 452 are inserted into the engagement portions 484, the elastic claws are engaged with the rear face of the recess portion 482 by means of elasticity. The memory chip 42 is formed so that the height is smaller than the depth of the depression of the recess portion 482, and hence secured in a state where the external shape of the memory chip 42 is fitted and depressed into the recess portion 482.

Namely, the memory chip 42 can be easily secured to the second housing 48 from the outside, and the electronic device support member 442 is placed between the cover 436 and the second housing 48. Moreover, the memory chip 42 is secured to the recess portion 482 in a depressed manner, and hence hardly detached from the housing from the outside. The material and strength of the elastic claws 452 are adjusted so that, when the secured memory chip 42 is pulled out from the outside, the elastic claws are broken. In the memory chip 42, the cover 436 and the recess portion 482 are colored in the same color and made of the same material, so that the attachment position of the memory chip in the process cartridge 4 is inconspicuous. Therefore, the memory chip 42 is hardly detached in an erroneous manner, whereby the memory chip can be prevented from being erroneously detached to disable the use the process cartridge 4. When the memory chip 42 is intentionally detached from the housing from the outside, one of the components such as the elastic claws 452 is broken. Therefore, replacement of the nonvolatile memory due to detachment from the outside can be prevented from occurring, so that the memory chip can store correct information characteristic of the process cartridge 4 and the image quality of the image forming apparatus 1 can be surely stabilized.

As described above, the first and second housings 46 and 48 are secured to each other by the securing pins 480, and separated from each other by removing the securing pins 480. The separated second housing 48 is configured so that the memory chip 42 can be detached from the inside of the housing without breaking the elastic claws 452. The securing pins 480 are configured so that only an authorized worker is allowed to detach the pins.

In this way, the elastic claws 452 enable the memory chip 42 to be easily attached to the second housing 48, and prevent the memory chip from being detached from the housing from the outside. In the case where the memory chip 42 becomes unnecessary such as that where the process cartridge 4 is to be discarded, the elastic claws 452 are broken so that the memory chip 42 can be easily detached from the housing from the outside. Since the communication with the control device body 30 is realized by radio communication, the memory chip 42 is attached to the surface side of the process cartridge 4, so that the memory chip can be prevented from being contaminated by a toner or the like.

The radio communication between the memory chip 42 and the control device body 30 in the embodiment is a mere example. For example, a hole may be formed in the base 438, and the communication may be realized by wire communication. The memory chip 42 may be configured so that the base 438 and the recess portion 482 are colored in the same color and made of the same material, the electronic device support member 442 is bonded to the rear face of the base 438, and the cover 436 is not used.

As described above, according to the invention, a cover of a memory chip is substantially disabled to be detached from a unit from the outside of the unit, and hence it is possible to store correct information.

What is claimed is:

1. A memory chip *assembly* which is to be attached to a unit, said memory chip *assembly* comprising:

an electronic device having a memory function;

a cover [which covers] *having a covering portion and a base which engages with the covering portion to form an inner side covering* said electronic device; and a securing section [which] substantially [disables] *preventing* said cover [to be] *from being* detached from [said ] *the* unit from an outside of [said] *the* unit, wherein said securing section has an elastic claw *disposed on said base*, and said elastic claw [is engaged with said] *engages the* unit to [perform securement] *prevent the cover from being detached from the unit*.

2. [A] *The* memory chip *assembly* according to claim 1, wherein *the unit is a cartridge and* said securing section is easily securable to, and substantially undetachable from, a surface of [a process] *the* cartridge which is detachably attached to an image forming apparatus main unit[, and which has at least an image carrier].

3. [A] *The* memory chip *assembly* according to claim 1, wherein said electronic device has a communication function.

[4. A memory chip according to claim 1, wherein a base is secured to an inner side of said cover, and said elastic claw is disposed on said base.]

5. [A] *The* memory chip *assembly* according to claim 1, wherein said cover [is] *and the unit are* made of a same material [as a material of said unit].

6. [A] *The* memory chip *assembly* according to claim 1, wherein said cover [is colored in a] *and the unit are the* same color [as a color of said unit].

7. [A] *The* memory chip *assembly* according to claim 1, wherein [said] *the* unit has a recess portion, and said cover is [fitted into said] *secured to the* recess portion to be secured in a depressed manner.

8. [A] *The* memory chip *assembly* according to claim 7, wherein when said cover is secured to [said] *the* recess portion in a depressed manner, [a] *an outer* surface of said cover is [at a same level as a surface of another recess] *substantially coplanar with a* portion of said unit adjacent to said recess portion.

9. [A] *The* memory chip *assembly* according to claim 1, wherein said electronic device is supported by an electronic device support member, and said electronic device support member is secured to an inner side of said cover.

10. [A] *The* memory chip *assembly* according to claim [1] *9*, wherein said electronic device support member has an antenna.

11. [A] memory chip *assembly* according to claim 1, wherein [said] *the* unit is a [process] cartridge having at least an image carrier.

12. A [process] cartridge [which is] detachably [attached] *attachable* to an image forming apparatus main unit[, and which has at least an image carrier], said [process] cartridge comprising:

a [process] cartridge [main] unit; and a memory chip *assembly* attached to said [process] cartridge [main] unit, wherein said memory chip *assembly* comprises: an electronic device having a memory function; a cover [which covers] *having a covering portion and a base which engages with the covering portion to form an inner side covering* said electronic device; and a securing section [which substantially disables] *to secure* said cover [from] *to* said [process] cartridge [main] unit [to be detached from an outside of said process cartridge], wherein said securing section has an elastic claw *disposed on said base*, and said elastic claw is engaged with said [process] cartridge [main] unit to [perform securement] *prevent said cover from being detached from said cartridge unit*.

13. An image forming apparatus comprising:

an image forming apparatus main unit; and a [process] cartridge which is detachably attached to said image forming apparatus main unit, [and which has at least an image carrier,]

wherein said [process] cartridge comprises a memory chip *assembly* including an electronic device having a memory function, a cover [which covers] *having a covering portion and a base which engages with the covering portion to form an inner side covering* said electronic device, and a securing section [which substantially disables] *to secure* said cover to [be detached from said process cartridge from] an outside *surface* of said [process] cartridge, wherein said securing section has an elastic claw *disposed on said base*, [and] said elastic claw [is] *being* engaged with said [process] cartridge to [perform securement] *secure the cover to said cartridge*.

*14. The cartridge according to claim 12, further comprising an image carrier.*

*15. The image forming apparatus according to claim 13, wherein the cartridge further comprises an image carrier.*

*16. A memory chip assembly, which is to be attached to a unit, the memory chip assembly comprising:*

*an electronic device having a memory function;*

*a housing including a cover having a covering portion and a base which engages with the covering portion to form an inner side covering the electronic device; and*

*an elastic claw being disposed on said base and extending from the housing for engaging the unit to secure the housing to the unit.*

*17. The memory chip assembly according to claim 16, wherein the unit defines an insertion hole for securably receiving the elastic claw.*

*18. The memory chip assembly according to claim 16, wherein the unit defines a recess portion having a depth, and wherein said housing is fitted into the recess portion.*

*19. The memory chip assembly according to claim 18, wherein the recess portion defines a concave-shaped depression.*

*20. The memory chip assembly according to claim 18, wherein the memory chip has a thickness less than the depth of the recess portion.*

*21. The memory chip assembly according to claim 18, wherein when the housing is fitted into the recess portion, a surface of the housing is substantially coplanar with a portion of the surface of the unit adjacent to the recess portion.*

*22. The memory chip assembly according to claim 16, wherein the elastic claw protrudes from an exterior surface of the housing.*

*23. The memory chip assembly according to claim 16, wherein said housing is securable to a surface of a cartridge, and wherein the cartridge is detachably attached to an image forming apparatus main unit.*

*24. The memory chip assembly according to claim 16, wherein the housing includes a cover, a support member within the housing to support the electronic device, and a base from which the elastic claw extends.*

*25. The memory chip assembly according to claim 16, wherein the electronic device has a communication function.*

*26. The memory chip assembly according to claim 25, wherein the electronic device support member includes an antenna.*

*27. The memory chip assembly according to claim 16, wherein the unit is a cartridge having at least an image carrier.*

*28. The memory chip assembly according to claim 16, wherein the cartridge is a toner cartridge including toner therein.*

*29. The memory chip assembly according to claim 16, wherein the housing is securable to a surface of the unit by the elastic claw.*

*30. A cartridge which is detachably attachable to an image forming apparatus main unit, the cartridge comprising:*

*a cartridge unit; and*

*a memory chip assembly according to claim 16, attached to the cartridge unit.*

*31. The cartridge according to claim 30, wherein the cartridge further comprises an image carrier.*

*32. The cartridge according to claim 30, wherein the cartridge is a toner cartridge including toner therein.*

*33. An image forming apparatus, comprising:*

*an image forming apparatus main unit; and*

*a cartridge according to claim 30, detachably attachable to said image forming apparatus main unit.*

*34. The image forming apparatus according to claim 33, wherein the cartridge includes an image carrier.*

*35. The cartridge according to claim 30, wherein the elastic claw extends in a first direction in which the housing is superimposed on the electronic device.*

*36. The cartridge according to claim 35, wherein a tip portion of the elastic claw extends in a second direction that intersects the first direction, toward an outside of the housing.*

*37. The cartridge according to claim 30, wherein the cartridge unit comprises a wall that surrounds the housing attached to the unit.*

*38. The cartridge according to claim 30, wherein the cartridge unit comprises a wall that entirely surrounds the housing attached to the unit.*

*39. The cartridge according to claim 30, wherein:*

*the cartridge unit defines a recess portion, and*

*the housing is inserted into the recess portion along a direction in which the housing is superimposed on the electronic device.*

*40. The cartridge according to claim 30, wherein:*

*the cartridge unit defines a recess portion,*

*the housing is fitted into the recess portion, and*

*the recess portion has a circular shape.*

*41. The cartridge according to claim 30, wherein the housing has a circular shape when viewed from above.*

*42. The memory chip assembly according to claim 16, wherein the elastic claw extends in a first direction in which the housing is superimposed on the electronic device.*

*43. The memory chip assembly according to claim 42, wherein a tip portion of the elastic claw extends in a second direction that intersects the first direction, toward an outside of the housing.*

*44. The memory chip assembly according to claim 16, wherein a wall of the unit surrounds the housing attached to the unit.*

*45. The memory chip assembly according to claim 16, wherein a wall of the unit entirely surrounds the housing attached to the unit.*

*46. The memory chip assembly according to claim 16, wherein:*

*the unit defines a recess portion, and*

*the housing is to be inserted into the recess portion along a direction in which the housing is superimposed on the electronic device.*

*47. The memory chip assembly according to claim 16, wherein:*

*the unit defines a recess portion,*

*the housing is to be fitted into the recess portion, and*

*the recess portion has a circular shape.*

*48. The memory chip assembly according to claim 16, wherein the housing has a circular shape when viewed from above.*

* * * * *